United States Patent
Kilian

(10) Patent No.: US 8,402,192 B2
(45) Date of Patent: Mar. 19, 2013

(54) MODULARLY CONSTRUCTED FIELD DEVICE OF PROCESS AUTOMATION TECHNOLOGY

(75) Inventor: Markus Kilian, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 368 days.

(21) Appl. No.: 12/733,125

(22) PCT Filed: Jul. 10, 2008

(86) PCT No.: PCT/EP2008/058972
§ 371 (c)(1),
(2), (4) Date: May 3, 2010

(87) PCT Pub. No.: WO2009/021788
PCT Pub. Date: Feb. 19, 2009

(65) Prior Publication Data
US 2010/0306436 A1     Dec. 2, 2010

(30) Foreign Application Priority Data
Aug. 10, 2007 (DE) .......................... 10 2007 038 061

(51) Int. Cl.
*G06F 13/00* (2006.01)
(52) U.S. Cl. .......... 710/300; 710/305; 710/301; 713/320
(58) Field of Classification Search .................. 710/300, 710/104, 301–306; 713/320
See application file for complete search history.

(56) References Cited

U.S. PATENT DOCUMENTS

| | | | |
|---|---|---|---|
| 6,055,596 A * | 4/2000 | Cepulis ......................... | 710/104 |
| 6,141,712 A * | 10/2000 | Sudhakaran et al. ......... | 710/104 |
| 2002/0073266 A1 | 6/2002 | Beuerfeind | |

FOREIGN PATENT DOCUMENTS

| | | |
|---|---|---|
| DE | 43 44 729 A1 | 6/1995 |
| DE | 100 43 841 A1 | 3/2002 |
| DE | 297 24 594 U1 | 5/2002 |
| DE | 103 55 790 B4 | 7/2005 |
| DE | 10 2004 036 362 A1 | 2/2006 |
| EP | 1 840 682 A1 | 10/2007 |
| WO | WO 2006/053211 A2 | 5/2006 |

\* cited by examiner

*Primary Examiner* — Brian Misiura
*Assistant Examiner* — Kim Huynh
(74) *Attorney, Agent, or Firm* — Bacon & Thomas, PLLC

(57) ABSTRACT

A modularly constructed field device of process automation technology having a basic card with an executable, basic program, wherein the basic card is expandable by at least one expansion card containing at least one, executable, expansion program. For executing the basic program, the basic card comprises at least one computing unit and a first memory unit matched to memory requirement of the executable, basic program, characterized in that the expansion card comprises at least a second memory unit designed for memory requirement of the expansion program, an automatic detecting of the connected expansion card is provided by the basic card, and, for expanding the basic program by the expansion program, a partial and/or intermittent accessing of the second memory unit by the computing unit is provided.

7 Claims, 2 Drawing Sheets

MODULARLY CONSTRUCTED FIELD DEVICE OF PROCESS AUTOMATION TECHNOLOGY

TECHNICAL FIELD

The invention relates to a modularly constructed field device of process automation technology, wherein the field device has a basic card containing an executable, basic program. The basic card is expandable by way of at least one expansion card containing at least one, executable, expansion program, wherein, for executing the basic program, the basic card comprises at least one computing unit and at least a first memory unit designed for the memory requirement of the executable, basic program.

BACKGROUND DISCUSSION

In industrial measurements technology, especially in automation, and process control, technology, field devices are applied, which, in the course of a process, ascertain process-variables by means of sensors or control control-variables by means of actuators. Such field devices ascertain and/or control, for example, pressure, flow, fill level, temperature or some other physical and/or chemical process variable as a process variable in a process. Available from Endress+Hauser are such field devices, for example, under the marks, CERABAR, DELTABAR, DELTAPILOT, PROMASS, LEVELFLEX, MICROPILOT, PROSONIC, SOLIPHANT, LIQUIPHANT and EASYTEMP. These serve primarily to determine and/or to monitor at least one of the above referenced process variables of a medium in a containment.

A feature common to all the above mentioned measuring, or field, devices is that, from the process variables ascertained by the sensors, a measured value is ascertained and evaluated by means of device electronics connected thereafter. This device electronics is, most often, so matched to the corresponding measuring requirements and the process variable to be measured, that, for each sensor principle, for each process variable to be measured and for each measuring performance, an independent device electronics must be developed. Another solution is e.g. to equip field devices of different measurement accuracy standards with a unified device electronics and with a maximal measuring performance and to activate or to deactivate the individual functionalities e.g. per software. This has, however, the disadvantage, that, by equipping the field device for maximal performance also maximum possible memory capacity must be provided for program and data, and the device electronics must already have all expansion electronics. This is very expensive.

Another possibility is to increase the functionality of a basic, standardized, device electronics by adding expansion electronics. Disadvantageous in the increasing of the functionality of the total field device by such expansion electronics is that the programs of the field device must be overwritten with a new version of an operating program matched to the expansion electronics, i.e. firmware must be overwritten and, also here, maximum memory size must be provided beforehand for the program and the data.

These solutions have the disadvantage that, as soon as the functional scope of a field device is desired to be expanded, the customer or operator has been obliged, to this point in time, either to obtain a completely new field device, or, after the possible plugging in of a new device module, to have new firmware written into the field device. The customer or operator would prefer, in the case of an expansion of the functionality of the field device, in general, not to have to buy a completely new field device, and the manufacturer cannot, for each field device, offer the opportunity to write over the firmware, since this implies, besides pure hardware costs, such as e.g. connectors, galvanically isolated lines, also a not to be disregarded logistical effort in managing the different programs and different device electronics.

SUMMARY OF THE INVENTION

An object of the invention is to provide a field device, whose performance and functionality can be simply matched to requirements and which can be implemented cost effectively.

This object is achieved according to the invention by features that the expansion card includes at least a second memory unit designed for the memory requirement of the expansion program, that an automatic detecting of the connected expansion card is provided by the basic card, and that, for expanding the basic program by expansion programs, the computing unit partially and/or intermittently accesses the second memory unit.

In the case of a preferred embodiment of the field device of the invention, an expansion electronics is provided on the expansion card.

An advantageous form of embodiment of the field device of the invention provides that the first memory unit contains a first data memory and a first program memory.

Another advantageous embodiment of the field device of the invention provides that the second memory unit contains a second data memory and/or a second program memory.

In an additional advantageous embodiment of the field device of the invention, an address decoder is provided for accessing individual addressable memory ranges of data memory and program memory.

In the case of an additional preferred form of embodiment of the field device of the invention, it is assumed, that data memory and program memory lie in fixedly predefined memory ranges of the computing unit.

In an additional preferred form of embodiment of the field device of the invention, a marker is provided at defined positions of program memory of the first memory unit, and/or of program memory of the second memory unit.

A supplementing form of embodiment of the field device of the invention permits that, for automatic detecting of connection of an expansion card on the basic card, a recurring electronic polling of the individual expansion card is provided.

Other preferred forms of embodiment of the field device of the invention take into consideration that, for automatic detecting of the connection of an expansion card on the basic card, a mechanical, electrical locking mechanism is provided.

Other details, features and advantages the subject matter of the invention will become evident from the subsequent description in view of the appended drawing, in which preferred examples of embodiments of the invention are presented. In the examples of embodiments of the invention shown in the figures of the drawing, for better overview and for simplification, elements corresponding in construction and/or function are provided with equal reference characters.

DETAILED DISCUSSION IN CONJUNCTION WITH THE DRAWINGS

Figure 1:
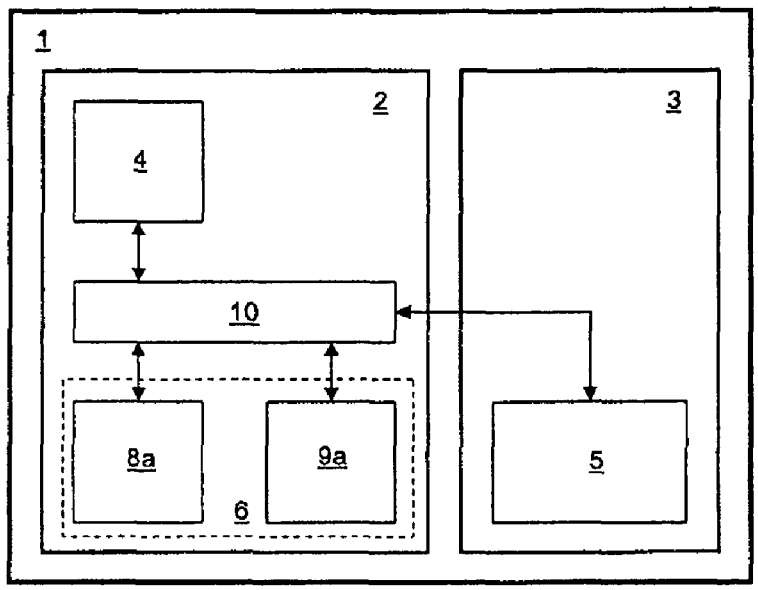
FIG. 1 is a modularly constructed field device of the state of the art.

FIG. 1 shows a field device 1 of the state of the art. The device electronics of this field device is provided by a basic card 2, which is embodied to be modularly expandable by an expansion card 3.

Field device 1 is, for example, a measuring device of process automation technology and contains a sensor, which registers a physical process variable. A sensor is a technical element, which quantitatively ascertains certain physical or chemical process variables, such as e.g. fill level, flow, pressure, pH-value, temperature, moisture, conductivity, in the form of an electrical, measured variable M. These process variables are registered by means of physical or chemical effects of the sensors and transduced into proportional, further processable, electrical, measured variables. The field device electronics on the basic card 2 includes, for example, also a signal conditioning unit, which correspondingly linearizes, amplifies, scales and/or calibrates the ascertained measurement signal. Furthermore, another option is that the field device 1 includes an actuator, or control element, which influences via a control variable a physical or chemical process variable in a process. The field device 1 of process automation technology communicates via a two-wire, connecting cable, or fieldbus, with additional field devices or with a superordinated control station, using e.g. a 4-20 mA, electrical current loop, PROFIBUS PA, FF or HART standard. Furthermore, the field device can be supplied via the fieldbus with the needed energy.

Figure 5:
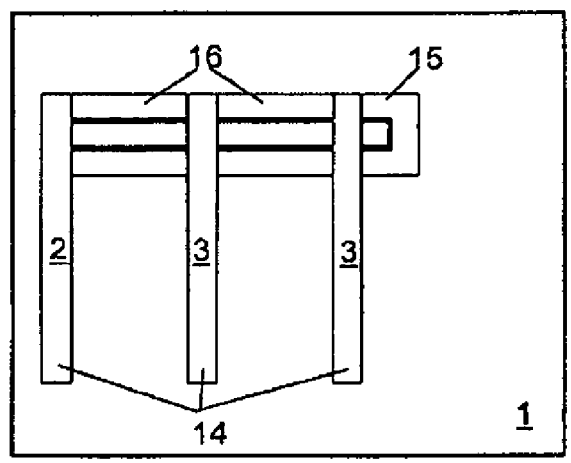
FIG. 5 shows a locking mechanism of the expansion cards.

For performing these measuring, control, and communication functionalities, the field device includes field device electronics having, most often, a computing unit 4, or microcontroller. This field device electronics of the field device 1 is, for example, provided on a circuit board 14 (FIG. 5) at least as basic card 2.

Basic card 2 of the field device 1 comprises at least one computing unit 4, an address decoder 10 and a first memory unit 6, which are connected with one another via data lines. Memory unit 6 is composed of a first data memory 8a for storing data and a first program memory 9a for the permanent storing of a basic program. The basic program contained in the first program memory 9a is read-out and executed via the address decoder 10 by the computing unit 4. The data and intermediate results arising in the execution of the basic program are stored in the first data memory 8a. The basic program includes only the basic functionalities of the field device 1, so that the field device 1 can perform basic functions, such as e.g. controlling the field device 1 and providing the basic measuring function. In order to be able to expand functionalities of the field device 1, it is necessary to add other functions through expansion programs in the first program memory 8a and/or through an expansion electronics 5 on the expansion card 3.

If, for expanding the functionality of the total field device 1, an expansion card 3 with an expansion electronics 5 is connected to the basic card 2 and/or the basic program is correspondingly supplemented by other program parts, then the basic program stored in the first program memory 8a of the basic card 2 must be replaced. This can, on the one hand, be effected by replacing the basic card 2, which contains the old basic program, with a new basic card 2, which contains a basic program expanded by the program parts, or, on the other hand, by writing over the first program memory 8a with a basic program expanded by these program parts.

For an expansion of the functional scope of a field device 1 in this way, the operator of the field device 1 must either replace the complete field device 1, or the basic card 2 of the field device 1, or, following the expanding of the basic card 2 by an expansion card 3, introduce a completely new basic program, or a new firmware, as the case may be, into the first program memory 8a.

The term "firmware" means, in general, a program, or software, which contains basic functions for control of the field device 1 and which is embedded in the first program memory 8a of the field device 1. This first program memory 8a is, for example, embodied as a flash memory, an EPROM or an EEPROM, which today can also be integrated directly in the computing unit 4, or microcontroller.

However, these approaches for expanding the functionality of the field device 1 are disadvantageous in that, on the one hand, customers do not like to buy a completely new device for each adjusting of field device capabilities and/or the manufacturer cannot offer, for each type of field device 1 and each retrofitting kit of a field device 1, the opportunity for writing over the basic program, or the firmware. This service of the offerer for overwriting, or flashing, the basic program, or the firmware, of such field devices 1, is, most often, not possible in all embodiments of the field device 1, since this would mean, besides pure device costs, such as, for example, additional connectors and galvanically separated lines, also a not to be disregarded logistical management effort for different basic programs, or firmware.

Figure 2:
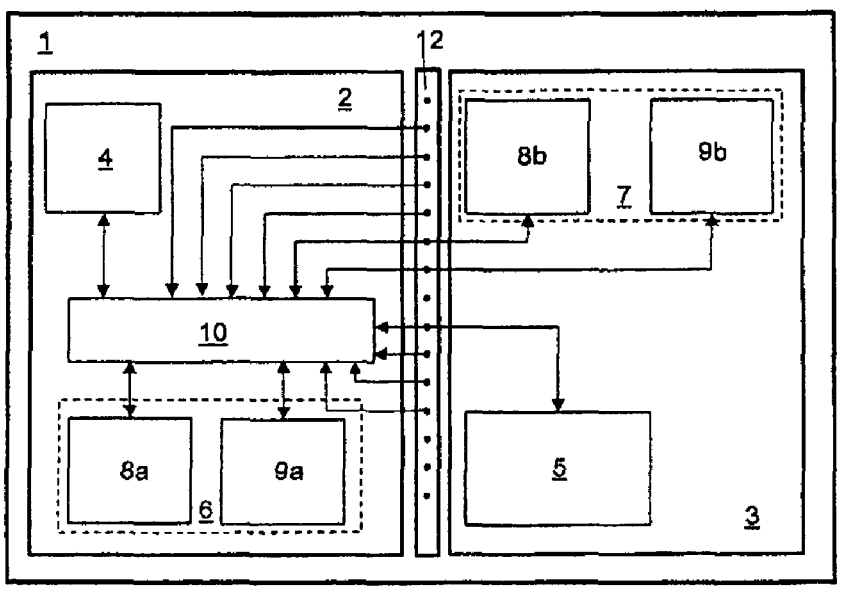
FIG. 2 is an example of an embodiment of the modular field device of the invention having a second memory unit on the expansion card.

The example of an embodiment of the invention shown in FIG. 2 avoids these disadvantages, in that the additional program parts for supplementing the basic program, or for providing the additional functions of the firmware, are supplied in a second program memory 9b on the expansion card 3. For this, a second memory unit 7 is provided on the expansion card 3. This second memory unit 7 contains a second data memory 8b for the volatile storage of further data and intermediate values from calculations of the computing unit 4. The second memory unit 7 also contains a second program memory 9b for the permanent storage of the expansion program, which supplies the supplementing program parts for the basic program. The expansion card includes, thus, not only the additional hardware in the form of an expansion electronics 5, such as e.g. an A/D-converter, a controller, a microprocessor, a digital signal processor, a temperature sensor and other sensors or actuators, possibly necessary for the expanded functionality, but also the required expansions of the memories and the programs. An additional opportunity is that the expansion card contains yet an additional second data memory 8b as a working memory, so that the maximum required working memory need not be provided unused on the basic card 2, but, instead, is available on the expansion card 3 in exact conformance with the requirements of the expansion programs. In this way, it is no longer necessary, that the basic program, or the firmware, in the first program memory 9a of the basic card 2 must be overwritten or even the entire basic card 2 replaced, since the expansion card 3 includes the missing program parts for the functional expansion and completes the needed working memory in the form of a second data memory 8b.

The second data memory 8b and the second program memory 9b of the second memory unit 7 are accessed via the address decoder 10 by the computing unit 4. If an external expansion card 3 is detected and activated, for example, by a switching of the mode of operation, then the computing unit 4 executes the additional functionality of the expansion program stored in the second program memory 9b of the expansion card 3. Through the expansion of the basic program by an expansion program, it can be necessary that, in the execution of the basic program and the expansion program by the computing unit 4, the second data memory 8b located on the expansion card 3 is used by the computing unit 4 as working memory.

The expansion card 3 is connected with the basic card 2 via a standardized interface 12. Via this interface 12, at least one expansion card 3 can be electrically connected to a basic card 2. For example, the interface 12 is embodied as a rack-system, in which the basic card 2 and the expansion card 3 are pushed into the rack-system via guiding rails and connected via a plugged connection with the parallel bus system.

Figure 3:
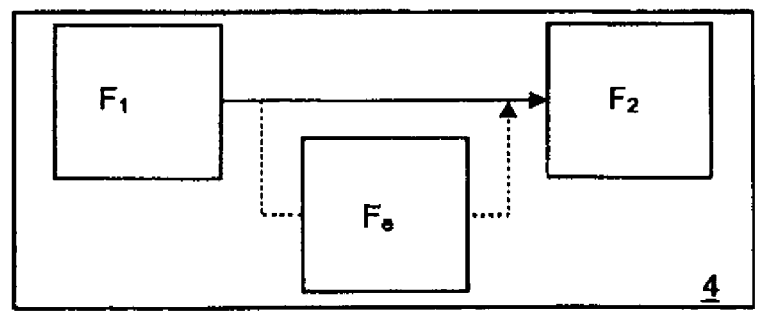
FIG. 3 is a function flow diagram with binding of an expansion program into the basic program.

The binding of program parts of the expansion program into the basic program is presented in the function flow diagram in FIG. 3.

The external functions $F_e$ of the expansion program in the second program memory 9b of the external expansion card 3 are integrated into the function flow of the basic program in the first program memory corresponding to a program flow list present in the computing unit 4. This integration occurs, for example, in that the individual functions $F_e$ of the expansion program or the individual functions $F_1$, $F_2$ of the basic program are invoked and executed via the address decoder 10 by the computing unit 4 in accordance with this program flow list.

Field device 1 is, for example, a fill-level measuring device, which ascertains a fill level in a process, on the basis of which pump control of a pump is performed. The field device 1 with the basic card 2 includes, for example, the basic program with the first function $F_1$ for the fill level measurement and the second function $F_2$ for the communication of a measured value via the fieldbus. For pump control, in contrast, still an external function $F_e$ is required, which includes a controller, which calculates from the measured value of the fill level a corresponding control value for the pump. This external function $F_e$ lies, according to the invention, in the second program memory 9b on the expansion card, so that this additional functionality for the pump control can be integrated into the basic functionality of the field device by connecting an expansion card 3 with a basic card 2.

Figure 4:
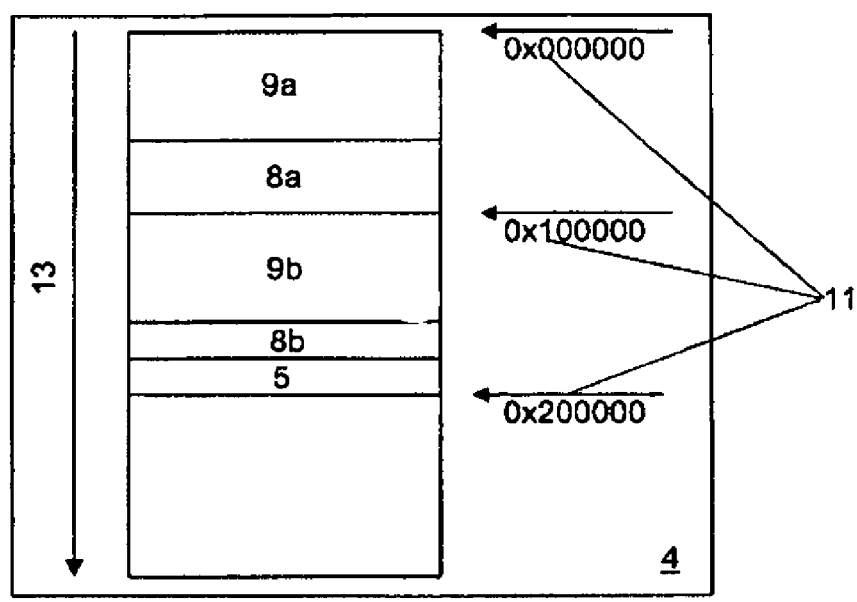
FIG. 4 shows memory assignments.

In order that the basic program can detect the additional expansion program in the second program memory 9b, this second program memory 9b can, for example, such as presented in FIG. 4 at previously defined memory ranges, be blended via the address decoder 10 into the address range of the computing unit 4. Additionally, a unique marker 11, e.g. a memory address, can be used, which lies at the beginning of the pertinent memory range and enables a unique identification of the expansion program. Any other method can be used for connection detection of the expansion card 3, for instance a method that perhaps is required in any event.

Since the individual functions of the basic program and the expansion programs are distributed on the different memory units 6 and 7, so called global program flow lists must be applied, which control the logical program execution. Further attention must be given to other information, such as, for example, parameter addresses, menu structures and texts of an on-site display, since these are now likewise distributed in the second memory units 7 on the expansion cards 3 and on the first memory unit 6 of the basic card 2. The handling of this distributed information occurs, for example, as follows: At the initializing of a field device 1 having a basic card 2 and at least one expansion card 3, by means of an initializing routine, an one-piece, global list is started in the working memory composed of at least the first data memory 8a and/or at least one second data memory 8b and the distributed information is brought together there.

Since the software of the device is no longer completely at one location, it is also possible to change expansion cards while the device is running: For this, it is necessary to detect the change request. The field device 1 must detect, that changes in the programs and/or the field device electronics should be carried out, whereby the field device 1 transfers into a basic functionality of the basic program, in which no accessing of the external, second data memory 8b or second program memory 9b occurs. In this way, it is prevented that, in the case of installation or removal of expansion cards, data and program errors occur due to wrong, inconsistent or incomplete data sets. If the change, i.e. the expansion of the programs and/or the field device electronics, is finished, the then supplementally present functionality on the expansion card 3 can be placed in operation. For detecting the change request, besides a parameter oriented input, especially also an automatic mechanical, electronic, locking mechanism of the expansion cards 3 can be used. The individual circuit boards 14 are equipped, for connection of signal lines, with connecting pieces 16, such as e.g. elongated, spring-action sockets. On the end of the last circuit board 14, a closure piece 15 is mounted, which short circuits two lines and so displays correct assembly. If an expansion card 3 or the closure piece 16, for example, is to be removed for the mounting of an additional expansion card 3, then the short circuit connection is interrupted and, through this change request, the field device 1 transfers to its basic functionality. In the basic functionality, the field device 1 performs only the basic program of the first program memory 8a on the basic card 2.

Another opportunity for displaying a change request is, for example, expansion cards 3, which are pushed into a rack-system. This rack-systems possess generally individual slide-in modules, in which each expansion card 3 and/or basic card 2 is locked by means of a locking mechanism. This locking mechanism can simultaneously serve as an electrical switch, which signals a change request.

The invention claimed is:

1. A modularly constructed field device of process automation technology having;
    a basic card with an executable, basic program; and
    at least one expansion card containing at least one, executable, expansion program, wherein:
    for executing said basic program, said basic card comprises at least one computing unit and a first memory unit matched to the memory requirement of said executable, basic program which contains a first data memory and a first program memory;
    said at least one expansion card comprises at least a second memory unit designed for memory requirement of said executable, expansion program which contains a second data memory and/or a second program memory;
    an automatic detecting of the connected said at least one expansion card is provided by said basic card;
    for expanding said basic program by said expansion program, a partial and/or intermittent accessing of said second memory unit by said at least one computing unit is provided, and
    global program flow lists is provided, which control the logical program execution since the individual functions of the basic program and the expansion programs are distributed on the different memory units.

2. The modularly constructed field device as claimed in claim 1, wherein:

expansion electronics is provided on said at least one expansion card.

3. The modularly constructed field device as claimed in claim 1, further having:
an address decoder for accessing individual addressable memory ranges of said data memory and said program memory.

4. The modularly constructed field device as claimed in claim 3,
wherein:
said data memory and said program memory lie in fixedly predefined memory ranges of said at least one computing unit.

5. The modularly constructed field device as claimed in claim 3, further having:
a marker at defined positions of said first program memory of said first memory unit, and/or said second program memory of said second memory unit.

6. The modularly constructed field device as claimed in claim 1, wherein:
for automatic detecting of the connection of said at least one expansion card to said basic card, a recurring electronic polling of individual expansion cards is provided.

7. The modularly constructed field device as claimed in claim 1, wherein:
for automatic detecting of the connection of said at least one expansion card to said basic card, a mechanical, electrical, locking mechanism is provided.

* * * * *